Figure 1:
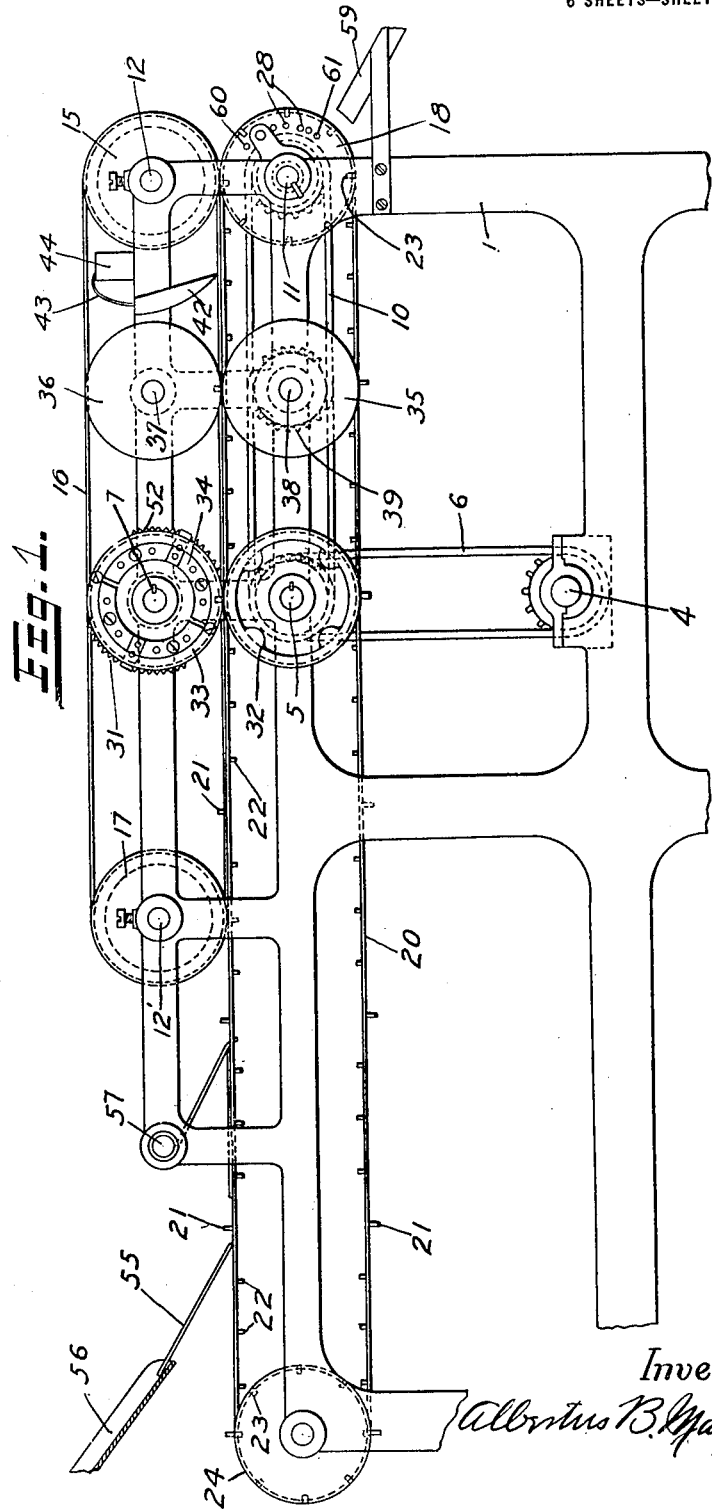

A. B. MATTINGLY.
MACHINE FOR TREATING ENVELOPS OR PAPER.
APPLICATION FILED MAR. 3, 1916.

1,206,880.

Patented Dec. 5, 1916.
6 SHEETS—SHEET 1.

Inventor:
Albertus B. Mattingly

A. B. MATTINGLY.
MACHINE FOR TREATING ENVELOPS OR PAPER.
APPLICATION FILED MAR. 3, 1916.

1,206,880.

Patented Dec. 5, 1916.
6 SHEETS—SHEET 3.

Inventor:
Albertus B. Mattingly

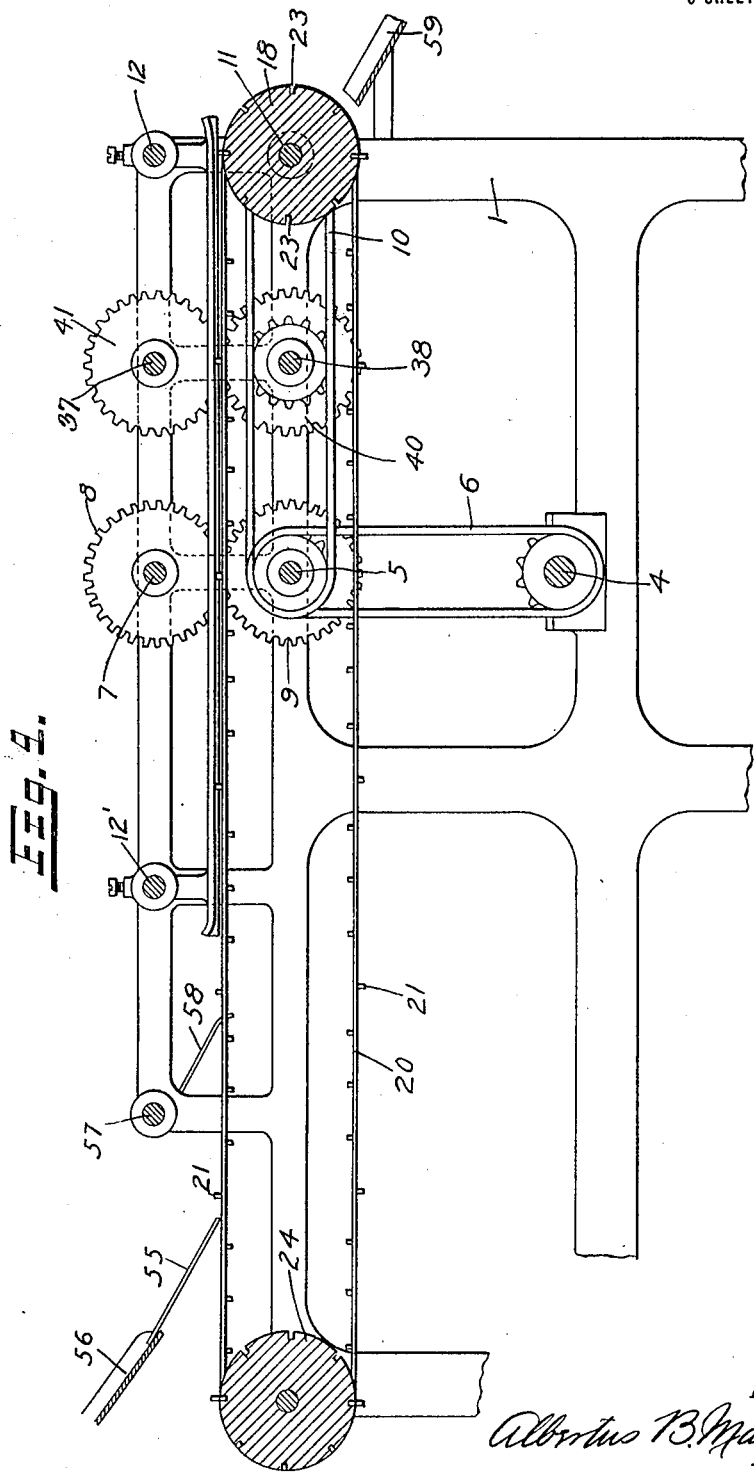

A. B. MATTINGLY.
MACHINE FOR TREATING ENVELOPS OR PAPER.
APPLICATION FILED MAR. 3, 1916.

1,206,880.

Patented Dec. 5, 1916.
6 SHEETS—SHEET 5.

Fig. 5.

Inventor:
Albertus B. Mattingly

A. B. MATTINGLY.
MACHINE FOR TREATING ENVELOPS OR PAPER.
APPLICATION FILED MAR. 3, 1916.
1,206,880.
Patented Dec. 5, 1916.
6 SHEETS—SHEET 6.
Fig. 7.  Fig. 8.  Fig. 9.
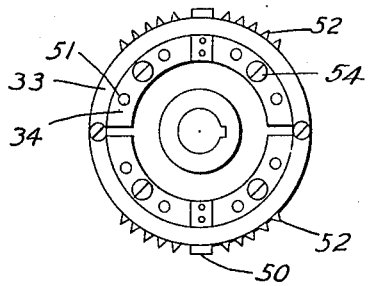 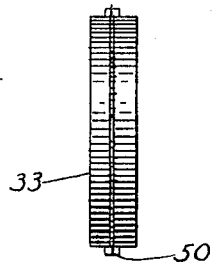 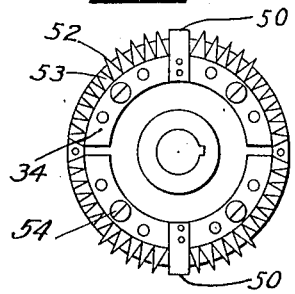
Fig. 10.  Fig. 11.  Fig. 12.
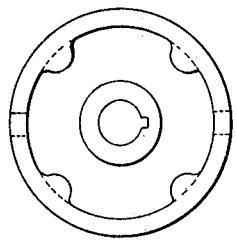 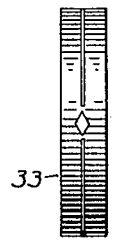 
Fig. 13.  Fig. 14.  Fig. 15.
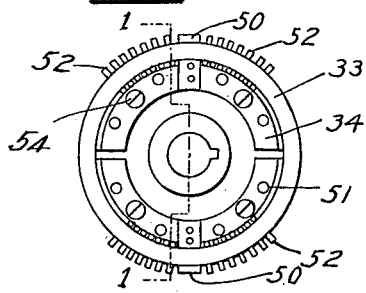 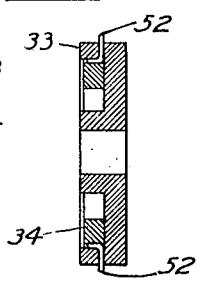 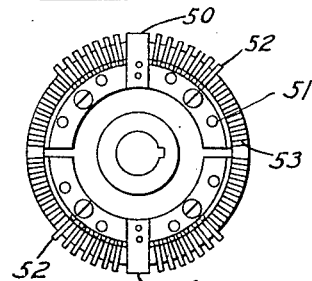
Fig. 16.  Fig. 17.  Fig. 18.
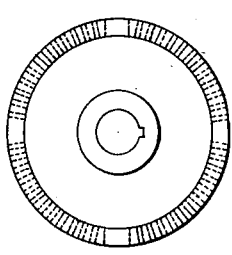 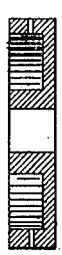 
Fig. 19. Fig. 20.
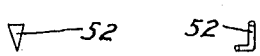
Inventor:
Albertus B. Mattingly

UNITED STATES PATENT OFFICE.

ALBERTUS B. MATTINGLY, OF NEW YORK, N. Y., ASSIGNOR TO RAYMOND A. MERRILL, OF NEW YORK, N. Y.

MACHINE FOR TREATING ENVELOPS OR PAPER.

1,206,880. Specification of Letters Patent. Patented Dec. 5, 1916.

Application filed March 3, 1916. Serial No. 81,869.

*To all whom it may concern:*

Be it known that I, ALBERTUS B. MATTINGLY, citizen of the United States, and resident of New York, in the county of New York and State of New York, have invented certain new and useful Improvements in Machines for Treating Envelops or Paper, of which the following is a specification.

This invention relates to improvements in perforating machines, and more especially to that class thereof known as automatic perforators.

The objects of this invention are to provide a machine or device of this character which will take care of the product or output of high speed machines, and perforate each individual sheet or envelop in sequence and deliver at the same speed as it receives the article from the press or envelop machine, and to provide a machine in which the style of perforation may be easily and quickly changed as well as the location of the perforation may be made to register perfectly and accurately as regards the edge of the article.

The still further objects will appear from the detailed description of the invention, which consists in the features of construction and combination of parts hereinafter described, claimed and shown in the illustration thereof.

It will be seen that I have accomplished the foregoing objects, by referring to the accompanying drawings forming a part of this specification and to define the general outline and spirit of the invention, but it will be understood that while I have shown only one combination of the principal embodiment of my invention to illustrate in a general way the principle thereof, I do not wish to confine my invention to the exact details of construction herein shown, as many modifications and mechanical equivalents may be substituted for the various parts shown without altering the operation or products of the invention, and I wish to reserve the right to make such alterations to conform with the condition and operation of the various machines with which it is to be used, and it is not thought necessary to show all of these modifications, as any one skilled in the art will readily see where these changes can be made in the invention by referring to the drawings, of which—

Figure 2:
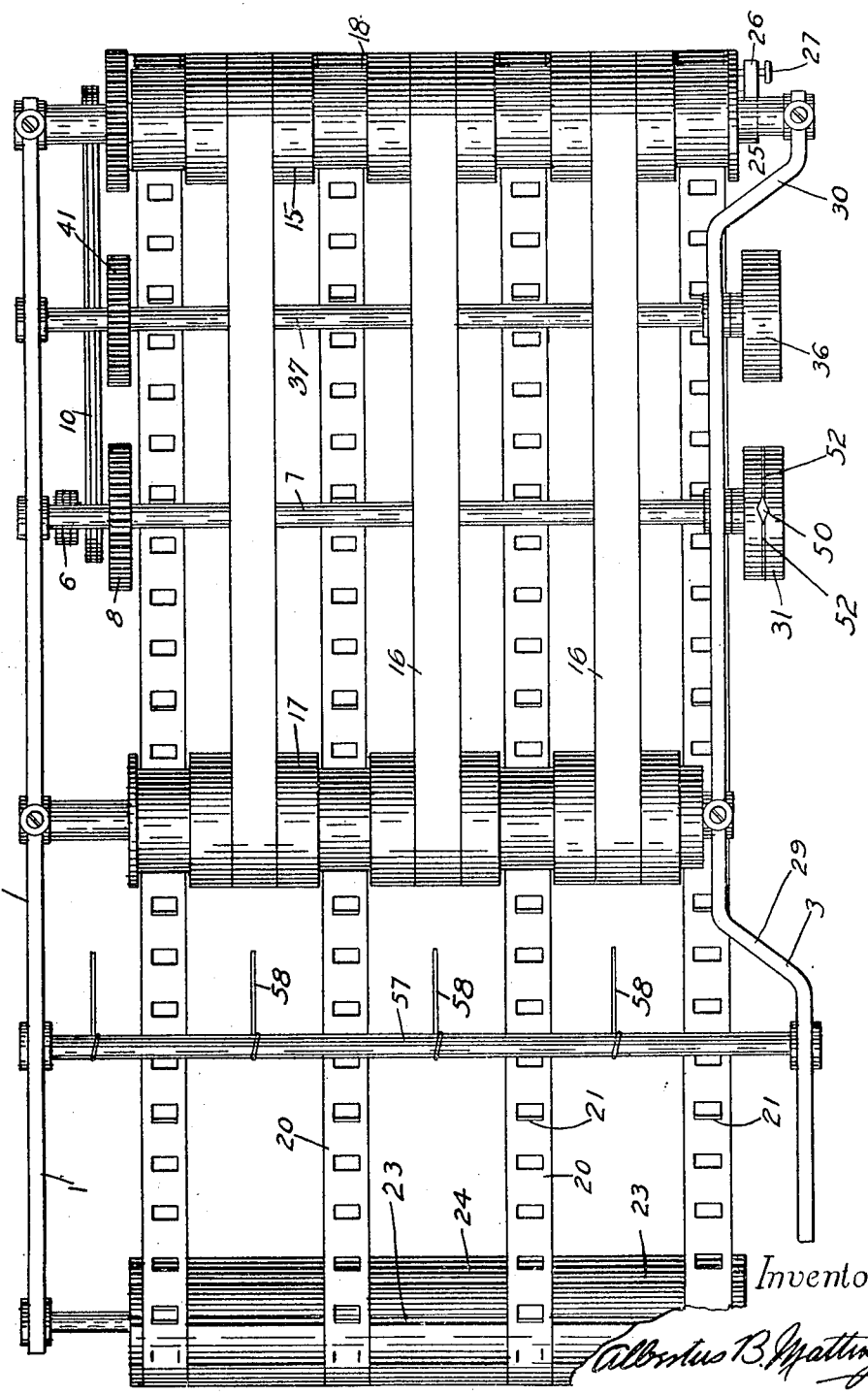
Figure 3:
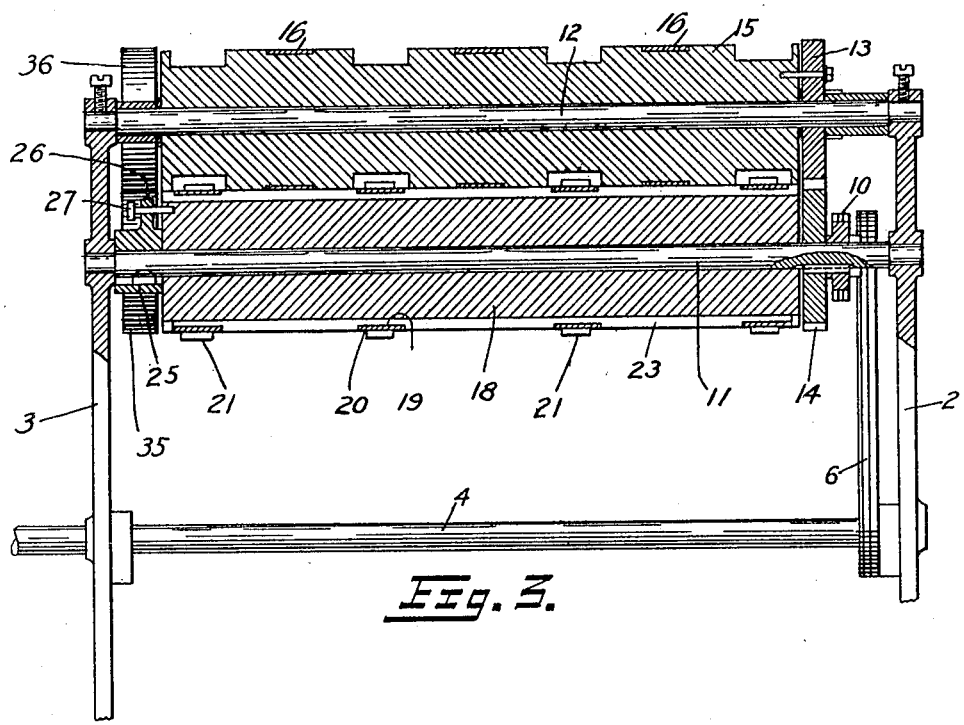
Figure 6:
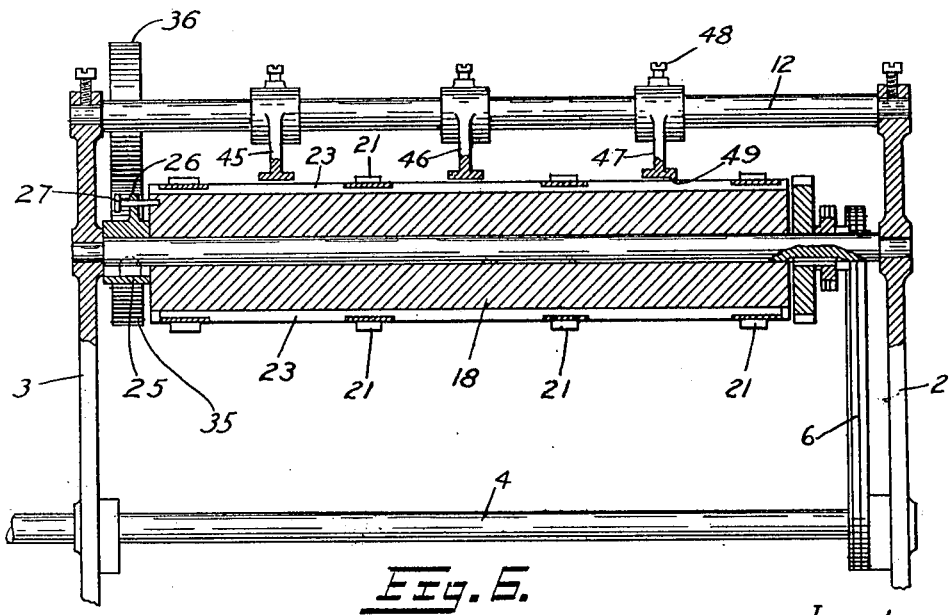

Figure 1 is a side elevation, partly broken away to disclose the general principle of my invention; Fig. 2 is a top plan of Fig. 1; Fig. 3 is a vertical sectional view taken through the driving roll or drum for the carrying belts, on line $x$—$x$ Fig. 1, and showing the means for driving the drums and also the means for adjusting the upper drum to and from the lower drum; Fig. 4 is a similar view to Fig. 1, but showing the upper belts and drums removed and adjustable slides or guides substituted in their place; Fig. 5 is a vertical section of Fig. 4; Fig. 6 is a transverse vertical section of Fig. 4, similar to Fig. 3; Fig. 7 is an enlarged end view of the male perforating drum; Fig. 8 is a side elevation of the male perforating drum; Fig. 9 is a similar view to that shown in Fig. 7, with the outside portion of the drum removed and showing how the spaces or recesses are formed therein for receiving the perforators or slitters; Fig. 10 is an end elevation of the female die or drum used in connection with the perforator shown in Fig. 7; Fig. 11 is a side elevation of Fig. 10; Fig. 12 is a vertical sectional view of Fig. 10; Fig. 13 is a similar view to Fig. 7, but showing a different style of perforating punches; Fig. 14 is a sectional view taken on the line 1—1 of Fig. 13; Fig. 15 is a similar view to Fig. 9; Fig. 16 is an end elevation of the female die or drum used in connection with the perforator shown in Fig. 13; Fig. 17 is a sectional view of Fig. 16; Fig. 18 is a view of one of the segments used to lock the perforators or slitters in position; Fig. 19 is one style of slitter or perforator; and Fig. 20 is another style of perforator.

Referring to Figs. 1 and 2 of the drawings, it will be seen that I provide a suitable frame 1 composed of side members or frames 2 and 3 suitably connected together for supporting the mechanism for accomplishing the foregoing objects, the side frames being so constructed as to allow easy access to the changeable parts, as will be seen by referring to Fig. 2.

Mounted in the frame, in suitable bearings, is the main driving shaft 4 for the sake of convenience in order that it may be geared or otherwise connected to the press or envelop machine it is to be operated with so as to keep in perfect time therewith as regards speed of production, but if desired this shaft could be omitted and this mechanism driven from the shaft 5, but I prefer not to do so.

The shaft 4 drives the shaft 5 through a sprocket chain 6, and the shaft 5 drives the shaft 7 through gears 8 and 9, each being made of two spur gears slightly out of register with each other and provided with means for adjusting this register to prevent back lash in the gears and to keep the shafts 5 and 7 in perfect register with each other in order to insure perfect cutting of the perforating punches. The shaft 5 is provided with a sprocket and chain 10, which drives the shaft 11. The shaft 11 drives the drum on the shaft 12 through the gears 13 and 14 secured to the drum 15 and the shaft 11. The drum 15 is a grooved drum, with a plurality of belts 16 connecting it with a similar drum 17. The shafts 12 and 12' are eccentric shafts, in other words these shafts are provided with eccentric ends and by adjusting them in the bearings and locking them by means of the screws the belts on the drums 15 and 17 are adjusted to and from the feed belts to suit the various thicknesses of envelops.

Loosely mounted on the shaft 11 is a drum 18 having circumferential grooves 19 for specially designed belts 20 in the form of carriers. These belts are preferably made of thin steel and their ends welded together, making them endless, and by means of punching they are provided with projections 21 bent outwardly to form means for carrying the sheets of paper or envelops along with the travel of the belts. Between the projections 21 are a plurality of reversed or inwardly projecting projections 22, which are engaged by the slots 23 running parallel with the axis of the drum. Thus it will be seen that by this formation the drum 18 acts the same as a sprocket wheel and the belts 20 act similarly to a sprocket chain running over an idle drum 24 of similar construction to the drum 18.

Located on the shaft 11 and keyed thereto is a collar 25 having an arm 26 carrying a pin or plug 27, which registers with a series of holes 28 in the drum 18 and forms the means for driving the drum 18 and the belts 20. The object of this will be described later on.

By referring to Figs. 1 and 2, it will be seen that the frame 2 is offset at 29 and 30 so as not to interfere with the travel of the envelop so that the edge may pass between the perforating wheels 31 and 32 located on the ends of the shafts 5 and 7 outside of the frame 2 for accessibility, so that the outside plates 33 and 34 of the wheels may be readily removed to change the number of perforating pins when desired or to change the style of wheels.

Located in the same plane with the perforating wheels 31 and 32 are a pair of ironing rollers 35 and 36 on shafts 37 and 38. On the shaft 38 is a sprocket wheel 39 operated by the sprocket chain 10 for driving the ironing roller 35. Also located on the shaft 38 is a spur gear 40 in mesh with a gear 41 for driving the roller 36.

Located on the frame 2, just behind the ironing rollers, is a ruling device of the well known character for marking the line of perforations when the style of perforator is used wherein the line of perforations is not plainly visible. This device consists of the well known ruling pen 42 used in ruling paper and having a wick 43 connecting it with a reservoir of ink 44.

In some instances it may be desirous for certain difficulties which arise, to substitute guides in place of the belts 16 and drums 15 and 17, and by referring to Figs. 4 to 6 it will be seen how I have arranged these guides 45, 46 and 47 upon the eccentric shafts 12 and 12', so that they can be adjusted to and from the carrying belts 20 the same as the belts 16. The guides 45 to 47 are also adjustable to and from the perforating drums and are held in position by the screws 48. The guide 47 is provided with a downwardly extending flange 49 for operating against the end of the envelops.

Located on the end of the shaft 7, and outside of the frame, is the perforating drum, having two punches 50 which for convenience I will term the main punches, which operate in connection with the female die or drum on the shaft 5. The perforating drum is also provided with dowel pins 51 for registering the outside segmental plates 34 for locking in position the perforators 52, which are inserted into the recesses 53. The segmental plates are held in position by the screws 54 so as to be easily removed when it is desired to change the number of perforators to make a longer or shorter line of perforations by inserting more perforators or removing some of the perforators.

It will be noted by referring to Figs. 7 to 17 that I have shown two styles of perforators, and many others could be used without departing from the general idea of the construction of the perforating wheels.

The object of making the drum 18 loose on the shaft is so that the projections 21 may be adjusted in their travel relatively to the timing of the main punches 50, so that the large perforation or sight hole will register in the center of the envelop.

It will be understood that the envelops or sheets of paper 55 drop from the chute 56 of the press or envelop machine on to the belts 20 into the spaces formed between each of the projections 21, and as they pass under the shaft or rod 57 the wipers 58, which are in the form of very flexible spring wire and serve to retard the travel of the envelop, which is forced beneath the wipers by the projections 21 and remains against them until it leaves the belts 20 and is deposited upon the chute 59 to be delivered to any desired destination. So that it will be seen that by withdrawing the pin 27 and resetting it in the direction of the hole 60 the main punches will register in the center of the small envelop, as it is understood that the hole 60 is for the smallest sized envelop and the hole 61 is for the largest sized envelop. The other holes 28 are for the various intermediate sizes of envelops.

The operation of the device is very simple. The shaft 4 being connected in any suitable manner to the machine with which this one is to run and made to run at the proper speed so that an envelop or sheet of paper is deposited in each space between the projections 21, the wipers perform their function and the belts properly carry the article on and pass its end or edge between the perforating drums and the perforating is done. The envelop then passes between the ironing drums, which force back any burs which may have been formed thereon, and on continuation of its travel if the inking mechanism is in operation a line will be drawn across the article, which is then delivered into the chute 59 to be delivered to any desired destination.

I claim as my invention:

1. In an organized machine for treating envelops or sheets of paper, the combination of continuously driven feeding belts to receive the envelops or papers from another source, means for evenly spacing the envelops or papers at predetermined spaces upon the belts, and means for perforating the envelops or papers during their travel on the belts.

2. In an organized machine for treating envelops or sheets of paper, the combination of continuously driven feeding belts to receive the envelops or papers from another source, means for evenly spacing the envelops or papers at predetermined spaces upon the belts, means for perforating the envelops or papers during their travel on the belts, and means for adjusting the feeding belts relatively to the perforators so as to properly register the perforations on the envelops or papers.

3. In an organized machine for treating envelops or sheets of paper, the combination of continuously driven feeding belts to receive the envelops or papers from another source, belts arranged above the feeding belts and driven with the feeding belts with means for adjusting the upper belts and the feeding belts to and from each other, means for evenly spacing the envelops or papers at predetermined spaces upon the belts, and means for perforating the envelops or papers during their travel on the belts.

4. In an organized machine for treating envelops or sheets of paper, the combination of continuously driven feeding belts to receive the envelops or papers from another source, belts arranged above the feeding belts and driven with the feeding belts with means for adjusting the upper belts and the feeding belts to and from each other, means for evenly spacing the envelops or papers at predetermined spaces upon the belts, means for perforating the envelops or papers during their travel on the belts, and means for adjusting the feeding belts relatively to the perforators so as to properly register the perforations on the envelops or papers.

5. In an organized machine for treating envelops or sheets of paper, the combination of continuously driven feeding belts to receive the envelops or papers from another source, slides or guides arranged above the feeding belts for guiding the envelops or sheets of paper with means for adjusting the slides or guides to and from the feeding belts, means for evenly spacing the envelops or papers at predetermined spaces upon the belts and means for perforating the envelops or papers during their travel on the belts.

6. In an organized machine for treating envelops or sheets of paper, the combination of continuously driven feeding belts to receive the envelops or papers from another source, slides or guides arranged above the feeding belts for guiding the envelops or sheets of paper with means for adjusting the slides or guides to and from the feeding belts, means for evenly spacing the envelops or papers at predetermined spaces upon the belts, means for perforating the envelops or papers during their travel on the belts, and means for adjusting the feeding belts relatively to the perforators so as to properly register the perforations on the envelops or papers.

7. In an organized machine for treating envelops or sheets of paper, the combination of continuously driven feeding belts to receive the envelops or papers from another source, means for evenly spacing the envelops or papers at predetermined spaces upon the belts, means for perforating the envelops or papers during their travel on the belts, and means for changing the style of perforator at will without disturbing the other parts of the machine.

8. In an organized machine for treating envelops or sheets of paper, the combination of continuously driven feeding belts to receive the envelops or papers from another source, means for evenly spacing the envelops or papers at predetermined spaces upon the belts, means for perforating the envelops or papers during their travel on the belts, means for adjusting the feeding belts relatively to the perforators so as to properly register the perforations on the envelops or papers, and means for changing the style of perforator at will without disturbing the other parts of the machine.

9. In an organized machine for treating envelops or sheets of paper, the combination of continuously driven feeding belts to receive the envelops or papers from another source, belts arranged above the feeding belts and driven with the feeding belts with means for adjusting the upper belts and the feeding belts to and from each other, means for evenly spacing the envelops or papers at predetermined spaces upon the belts, means for perforating the envelops or papers during their travel on the belts, and means for changing the style of perforator at will without disturbing the other parts of the machine.

10. In an organized machine for treating envelops or sheets of paper, the combination of continuously driven feeding belts to receive the envelops or papers from another source, belts arranged above the feeding belts and driven with the feeding belts with means for adjusting the upper belts and the feeding belts to and from each other, means for evenly spacing the envelops or papers at predetermined spaces upon the belts, means for perforating the envelops or papers during their travel on the belts, means for adjusting the feeding belts relatively to the perforators so as to properly register the perforations on the envelops or papers, and means for changing the style of perforator at will without disturbing the other parts of the machine.

11. In an organized machine for treating envelops or sheets of paper, the combination of continuously driven feeding belts to receive the envelops or papers from another source, slides or guides arranged above the feeding belts for guiding the envelops or sheets of paper with means for adjusting the slides or guides to and from the feeding belts, means for evenly spacing the envelops or papers at predetermined spaces upon the belts, means for perforating the envelops or papers during their travel on the belts, and means for changing the style of perforator at will without disturbing the other parts of the machine.

12. In an organized machine for treating envelops or sheets of paper, the combination of continuously driven feeding belts to receive the envelops or papers from another source, slides or guides arranged above the feeding belts for guiding the envelops or sheets of paper with means for adjusting the slides or guides to and from the feeding belts, means for evenly spacing the envelops or papers at predetermined spaces upon the belts, means for perforating the envelops or papers during their travel on the belts, means for adjusting the belts relatively to the perforators so as to properly register the perforations on the envelops or papers, and means for changing the style of perforator at will without disturbing the other parts of the machine.

13. In an organized machine for treating envelops or sheets of paper, the combination of continuously driven feeding belts to receive the envelops or papers from another source, means for evenly spacing the envelops or papers at predetermined spaces upon the belts, means for perforating the envelops or papers during their travel on the belts, and means for marking said perforations.

14. In an organized machine for treating envelops or sheets of paper, the combination of continuously driven feeding belts to receive the envelops or papers from another source, means for evenly spacing the envelops or papers at predetermined spaces upon the belts, means for perforating the envelops or papers during their travel on the belts, means for adjusting the feeding belts relatively to the perforators so as to properly register the perforations on the envelops or papers, and means for marking said perforations.

15. In an organized machine for treating envelops or sheets of paper, the combination of continuously driven feeding belts to receive the envelops or papers from another source, belts arranged above the feeding belts and driven with the feeding belts with means for adjusting the upper belts and the feeding belts to and from each other, means for evenly spacing the envelops or papers at predetermined spaces upon the belts, means for perforating the envelops or papers during their travel on the belts, and means for marking said perforations.

16. In an organized machine for treating envelops or sheets of paper, the combination of continuously driven feeding belts to receive the envelops or papers from another source, belts arranged above the feeding belts and driven with the feeding belts with means for adjusting the upper belts and the feeding belts to and from each other, means for evenly spacing the envelops or papers at predetermined spaces upon the belts, means for perforating the envelops or papers during their travel on the belts, means for adjusting the feeding belts relatively to the perforators so as to properly register the perforations on the envelopes or papers, and means for marking said perforations.

17. In an organized machine for treating envelops or sheets of paper, the combination of continuously driven feeding belts to receive the envelops or papers from another source, slides or guides arranged above the feeding belts for guiding the envelops or sheets of paper with means for adjusting the slides or guides to and from the feeding belts, means for evenly spacing the envelops or papers at predetermined spaces upon the belts, means for perforating the envelops or papers during their travel on the belts, and means for marking said perforations.

18. In an organized machine for treat-envelops or sheets of paper, the combination of continuously driven feeding belts to receive the envelops or papers from another source, slides or guides arranged above the feeding belts for guiding the envelops or sheets of paper with means for adjusting the slides or guides to and from the feeding belts, means for evenly spacing the envelops or papers at predetermined spaces upon the belts, means for perforating the envelops or papers during their travel on the belts, means for adjusting the belts relatively to the perforators so as to properly register the perforations on the envelops or papers, and means for marking said perforations.

19. In an organized machine for treating envelops or sheets of paper, the combination of a frame, a pair of continuously driven drums, belts on said drums to receive the envelops or sheets of paper from another source or machine, means for driving said belts, and means for perforating the envelops or papers while traveling on said belts, the said belts being in the form of metallic bands and having a portion of their metal bent outwardly at predetermined spaces to form carriers.

20. In an organized machine for treating envelops or sheets of paper, the combination of a frame, a pair of continuously driven drums, belts on said drums to receive the envelops or sheets of paper from another source or machine, means for driving said belts, and means for perforating the envelops or papers while traveling on said belts, the said belts being in the form of metallic bands and having a portion of their metal bent outwardly at predetermined spaces to form carriers and a portion of metal bent inwardly at predetermined intervals or spaces to form projections or teeth to work in conjunction with the slots in the said drums.

21. In an organized machine for treating envelops or sheets of paper, the combination of a frame, a pair of continuously driven drums, belts on said drums to receive the envelops or sheets of paper from another source or machine, means for driving said belts, means for perforating the envelops or papers while traveling on said belts, the said belts being in the form of metallic bands and having a portion of their metal bent outwardly at predetermined spaces to form carriers and a portion of metal bent inwardly at predetermined intervals or spaces to form projections or teeth to work in conjunction with the slots in the said drums, one of said drums being loosely mounted on its shaft, a device in the form of a collar having an arm and keyed to said shaft, a removable pin or locking means for connecting said arm to said drum, and holes in the end of said drum for changing the relative position of said drum to the arm, said holes being arranged to suit the various sizes of envelops so that the envelops will properly register with the perforating means.

22. In an organized machine for treating envelops or sheets of paper, the combination of a frame, a pair of continuously driven drums, belts on said drums to receive the envelops or sheets of paper from another source or machine, means for driving said belts, means for perforating the envelops or papers while traveling on said belts, the said belts being in the form of metallic bands and having a portion of their metal bent outwardly at predetermined spaces to form carriers, and a second set of drums and belts mounted above the said belts, the second set of drums being mounted loosely on eccentric shafts mounted in said frame and locked in position by screws in the frame for adjusting the second set of belts relatively to the first set of belts.

23. In an organized machine for treating envelops or sheets of paper, the combination of a frame, a pair of continuously driven drums, belts on said drums to receive the envelops or sheets of paper from another source or machine, means for driving said belts, means for perforating the envelops or papers while traveling on said belts, the said belts being in the form of metallic bands and having a portion of their metal bent outwardly at predetermined spaces to form carriers and a portion of metal bent inwardly at predetermined intervals or spaces to form projections or teeth to work in conjunction with the slots in the said drums, and a second set of drums and belts mounted above the said belts, the second set of drums being mounted loosely on eccentric shafts mounted in said frame and locked in position by screws in the frame for adjusting the second set of belts relatively to the first set of belts.

24. In an organized machine for treating envelops or sheets of paper, the combination of a frame, a pair of continuously driven drums, belts on said drums to receive the envelops or sheets of paper from another source or machine, means for driving said belts, means for perforating the envelops or papers while traveling on said belts, the said belts being in the form of metallic bands and having a portion of their metal bent outwardly at predetermined spaces to form carriers and a portion of metal bent inwardly at predetermined intervals or spaces to form projections or teeth to work in conjunction with the slots in the said drums, one of said drums being loosely mounted on its shaft, a device in the form of a collar having an arm and keyed to said shaft, a removable pin or locking means for connecting said arm to said drum, holes in the end of said drum for changing the relative position of said drum to the arm, said holes being arranged to suit the various sizes of envelops so that the envelops will properly register with the perforating means, and a second set of drums and belts mounted above the said belts, the second set of drums being mounted loosely on eccentric shafts mounted in said frame and locked in position by screws in the frame for adjusting the second set of belts relatively to the first set of belts.

Signed at New York, in the county of New York and State of New York this 26th day of February, A. D. 1916.

ALBERTUS B. MATTINGLY.

Witnesses:
J. R. MATTINGLY,
JOHN W. HAZLETT.

Copies of this patent may be obtained for five cents each, by addressing the "Commissioner of Patents, Washington, D. C."